United States Patent
Chen et al.

(10) Patent No.: US 9,693,656 B2
(45) Date of Patent: Jul. 4, 2017

(54) GRILL

(71) Applicant: Coopway Industries, INC, Shanghai (CN)

(72) Inventors: Yuxuan Chen, Hunan (CN); Juan Chen, Hunan (CN); Yao Zou, Hunan (CN); Jun Chen, Hunan (CN)

(73) Assignee: Changsha Eletric Drive System Technology Co., LTD, Changsha, Hunan (CN)

( * ) Notice: Subject to any disclaimer, the term of this patent is extended or adjusted under 35 U.S.C. 154(b) by 938 days.

(21) Appl. No.: 13/935,559

(22) Filed: Jul. 5, 2013

(65) Prior Publication Data

US 2014/0290498 A1 Oct. 2, 2014

(30) Foreign Application Priority Data

Mar. 29, 2013 (CN) .......................... 2013 1 0108833

(51) Int. Cl.
*A47J 37/00* (2006.01)
*A47J 37/07* (2006.01)
*A47J 37/06* (2006.01)

(52) U.S. Cl.
CPC ......... *A47J 37/0786* (2013.01); *A47J 37/067* (2013.01); *A47J 37/0704* (2013.01)

(58) Field of Classification Search
CPC ... A47J 37/0786; A47J 37/067; A47J 37/0704
USPC ................................. 99/340, 407, 408, 446
See application file for complete search history.

(56) References Cited

U.S. PATENT DOCUMENTS

| | | | | |
|---|---|---|---|---|
| 4,127,099 A * | 11/1978 | Fortier | ................. | A47J 37/0704 126/505 |
| 6,247,468 B1 * | 6/2001 | Wood | .................. | A47J 37/0786 126/25 R |
| 7,798,139 B2 * | 9/2010 | Gagas | ................. | A47J 37/0704 126/1 R |
| 8,347,874 B2 * | 1/2013 | Bruno | ................. | A47J 37/0713 126/25 R |
| 2002/0148459 A1 * | 10/2002 | McCarty | ............. | A47J 37/0713 126/25 R |
| 2004/0149277 A1 * | 8/2004 | Han | ...................... | A47J 37/067 126/25 R |
| 2004/0154477 A1 * | 8/2004 | Han | ...................... | A47J 37/067 99/447 |
| 2004/0154607 A1 * | 8/2004 | Han | ...................... | A47J 37/067 126/39 R |
| 2005/0089318 A1 * | 4/2005 | Lai | ...................... | A47J 37/0623 392/418 |

(Continued)

*Primary Examiner* — Omar Flores Sanchez

(57) ABSTRACT

A grill includes an upper cover, a supporting body and a grill frame. The grill frame is provided on the supporting body. The grill frame includes left and right boards, a back board and a front board, which all enclose into the grill frame. Heaters are provided within the grill frame and a roasting plate which tilts towards a front of the grill frame is provided above the heaters. The roasting plate has slots from which oil and grease drip down into an oil dripping slot provided on the front board and then into an oil guiding slot provided below the front board. The oil guiding slot has an oil channel of a certain angle. An oil collecting box is provided below a side of the oil guiding slot. A warming net is provided above the roasting plate and mounted on the left and right boards.

6 Claims, 9 Drawing Sheets

(56) References Cited

U.S. PATENT DOCUMENTS

2010/0123374 A1\* 5/2010 Tsung ................ A47J 37/0786
       312/100
2010/0242943 A1\* 9/2010 Laporta ............... A47J 37/0704
       126/25 B \* cited by examiner

GRILL

BACKGROUND OF THE PRESENT INVENTION

Field of Invention

The present invention relates to a roasting tool, and more particularly to a grill which collects oil rapidly and simply.

Description of Related Arts

Conventionally, an oil collecting device of a grill is provided below a burner and quite close to fire, which is liable to cause fire accidents and ignite fire on an oil collecting plate and thus poses a potential danger. Besides, it is difficult to wholly collect oil drops dripping down during roasting and many oil drops splash down onto a coal plate to cause plenty of soot, so as to not only affects users' health but also pollutes environment, which remains to be avoided.

SUMMARY OF THE PRESENT INVENTION

An object of the present invention is to provide a grill which collects oil and grease produced in a process of roasting via improving a structure of a roasting plate and providing the roasting plate at a predefined angle, avoids wasting heat to save energy via reflecting boards and an insulating board and avoids conducting heat into a supporting body via the insulating board, so as to avoid potential danger.

Accordingly, the present invention adopts following technical solutions. A grill comprises an upper cover, a supporting body and a grill frame. The grill frame is provided at an upper end of the supporting body. The upper cover is provided at an upper end of the grill frame and is able to open and close. The grill frame comprises left and right boards, a back board and a front board, which all enclose into the grill frame. Heaters are provided within the grill frame and a roasting plate which tilts towards a front of the grill frame is provided above the heaters. The roasting plate has slots from which oil and grease drip down into an oil dripping slot provided on the front board and then into an oil guiding slot provided below the front board. The oil guiding slot has an oil channel provided at a certain angle. An oil collecting box is provided below a side of the oil guiding slot. A warming net is provided above the roasting plate and mounted on the left and right boards. A panel is provided in front of the front board.

Reflecting boards for reflecting downward heat produced in the process of roasting onto food to roast the food are provided at internal sides of the left and right boards. An insulating board for preventing heat from entering the supporting body is provided at a bottom of the grill frame.

Further, a holder for holding the roasting plate is provided at an internal side of the back board and the holder has two holding positions.

Further, the roasting plate has two surfaces, comprising a roasting board having the slots and a flat frying board.

Preferably, the roasting plate has a hole for observing fire and a flange is provided at a periphery of the hole.

Further, a lateral frame and a lateral stove are respectively provided at two sides of the supporting body and also at two sides of the grill frame.

Further, trundles are provided at a bottom of the supporting body.

Compared to prior arts, the grill provided by the present invention has following advantages.

Firstly, a back end of the roasting plate is raised to tilt a front thereof, in such a manner that the roasting oil and grease flow out through the front.

Secondly, the roasting plate has the slots for guiding the oil and grease to the front.

Thirdly, after being collected by the slots of the roasting plate, the oil and grease drip down via the oil dripping slot into the oil guiding slot at the certain angle, so as to smoothly enter the oil collecting box, which prevents the oil and grease from being affected by high temperature and is safe and environment-friendly.

Fourthly, the reflecting boards reflect the heat conducted downwards onto the food to roast the food, which avoids wasting the heat and saves energy.

Fifthly, the insulating boards are provided to avoid conducting the heat into the supporting body, so as to avoid affecting a temperature of a steel cylinder, which brings insulation effects and leads to a heat reflecting function, wherein the heat is reflected onto the food to roast the food, so as to avoid wasting the heat.

These and other objectives, features, and advantages of the present invention will become apparent from the following detailed description, the accompanying drawings, and the appended claims.

DETAILED DESCRIPTION OF THE PREFERRED EMBODIMENT

Figure 1:
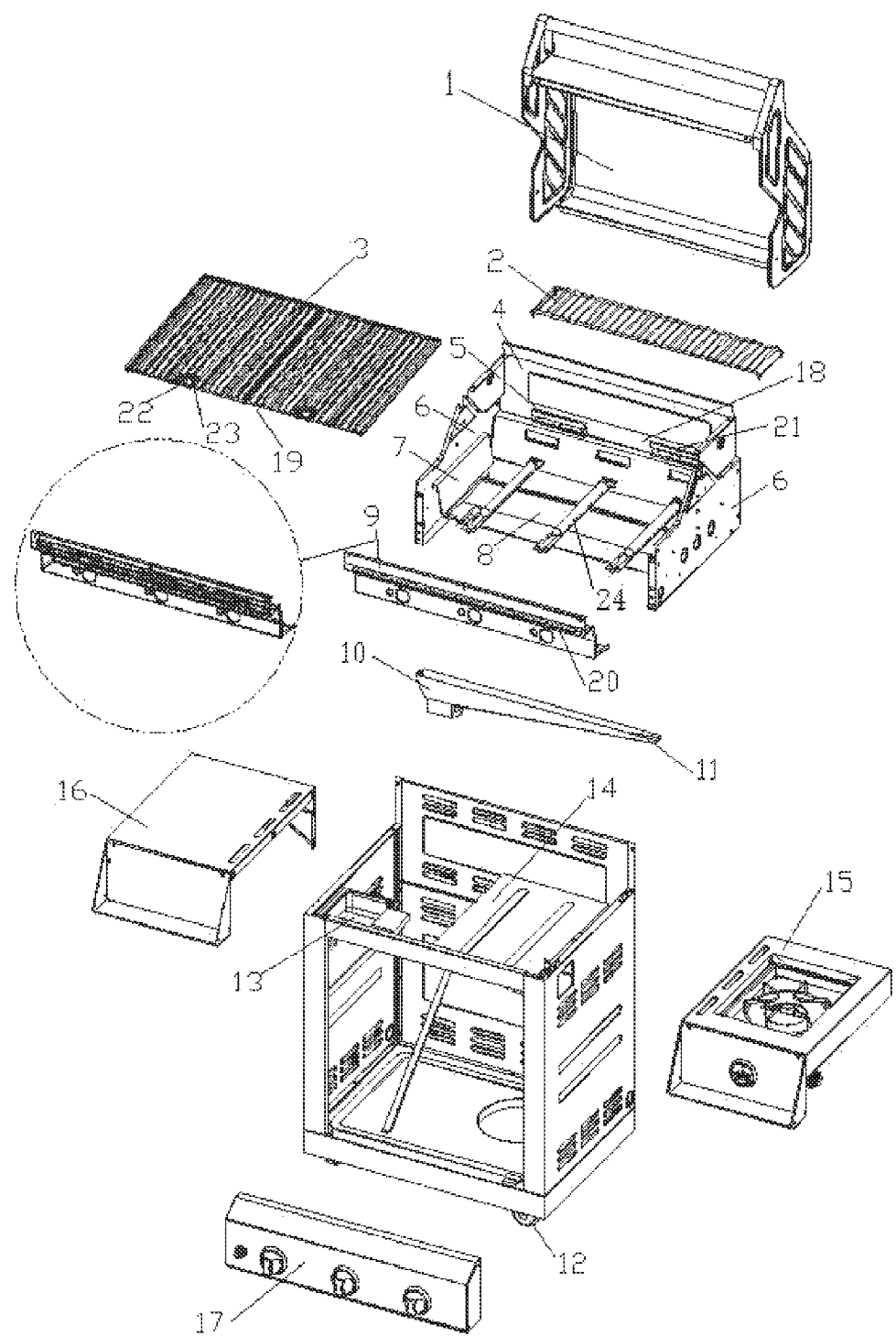
FIG. 1 is an exploded view of a grill according to a preferred embodiment of the present invention.
Figure 2:
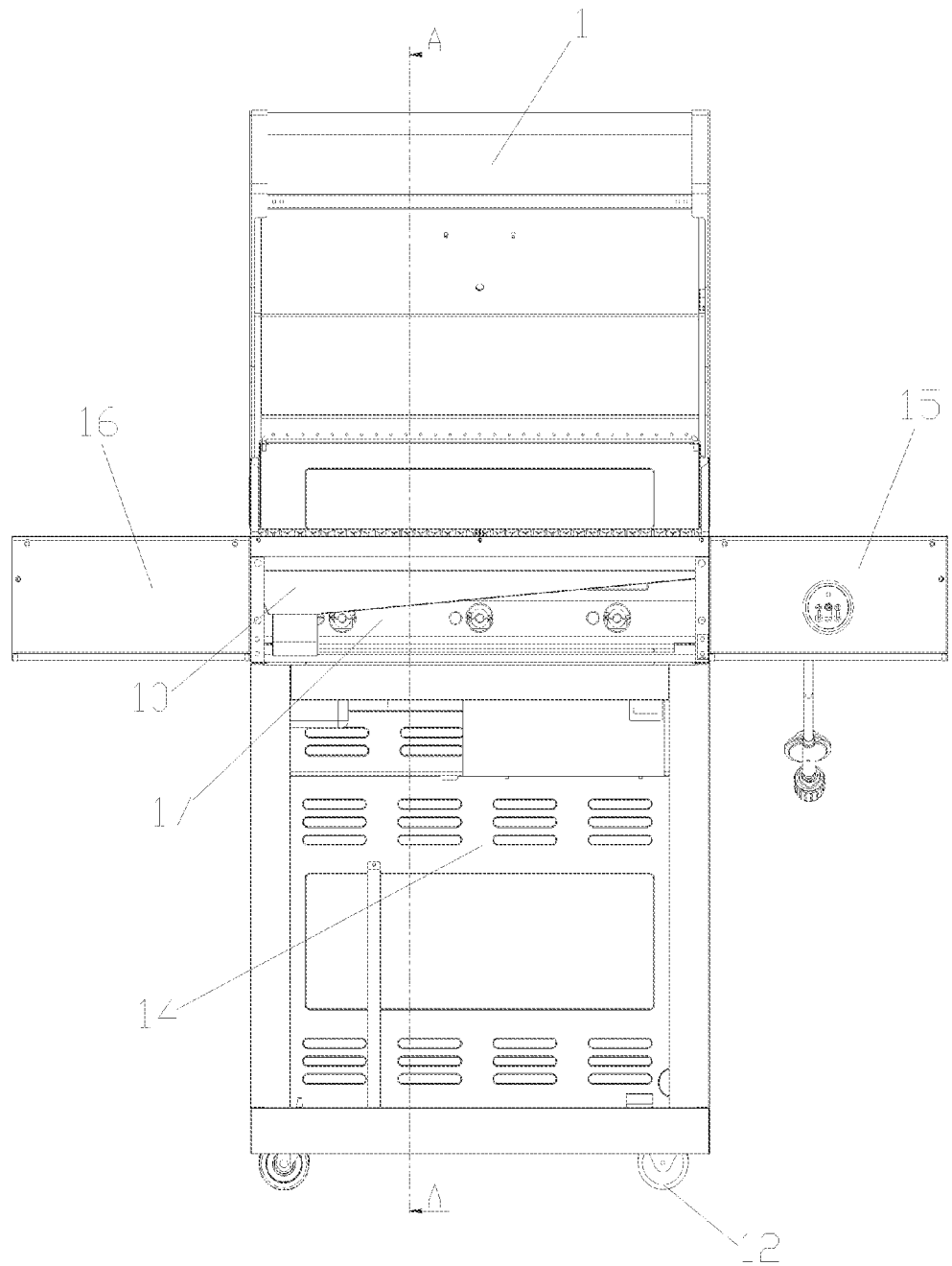
FIG. 2 is a front view of the grill according to the preferred embodiment of the present invention.
Figure 3:
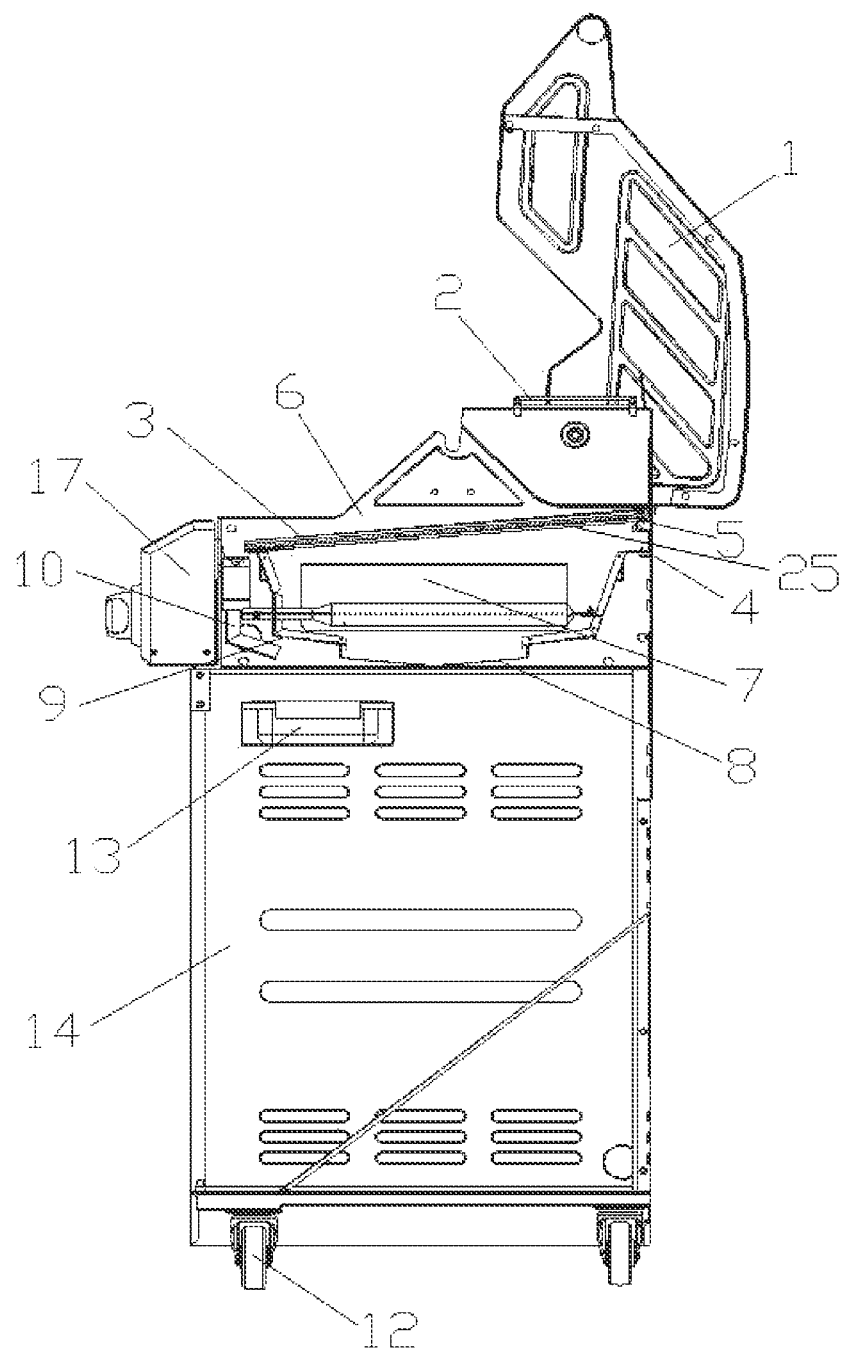
FIG. 3 is a sectional view of A-A of FIG. 2.
Figure 4:
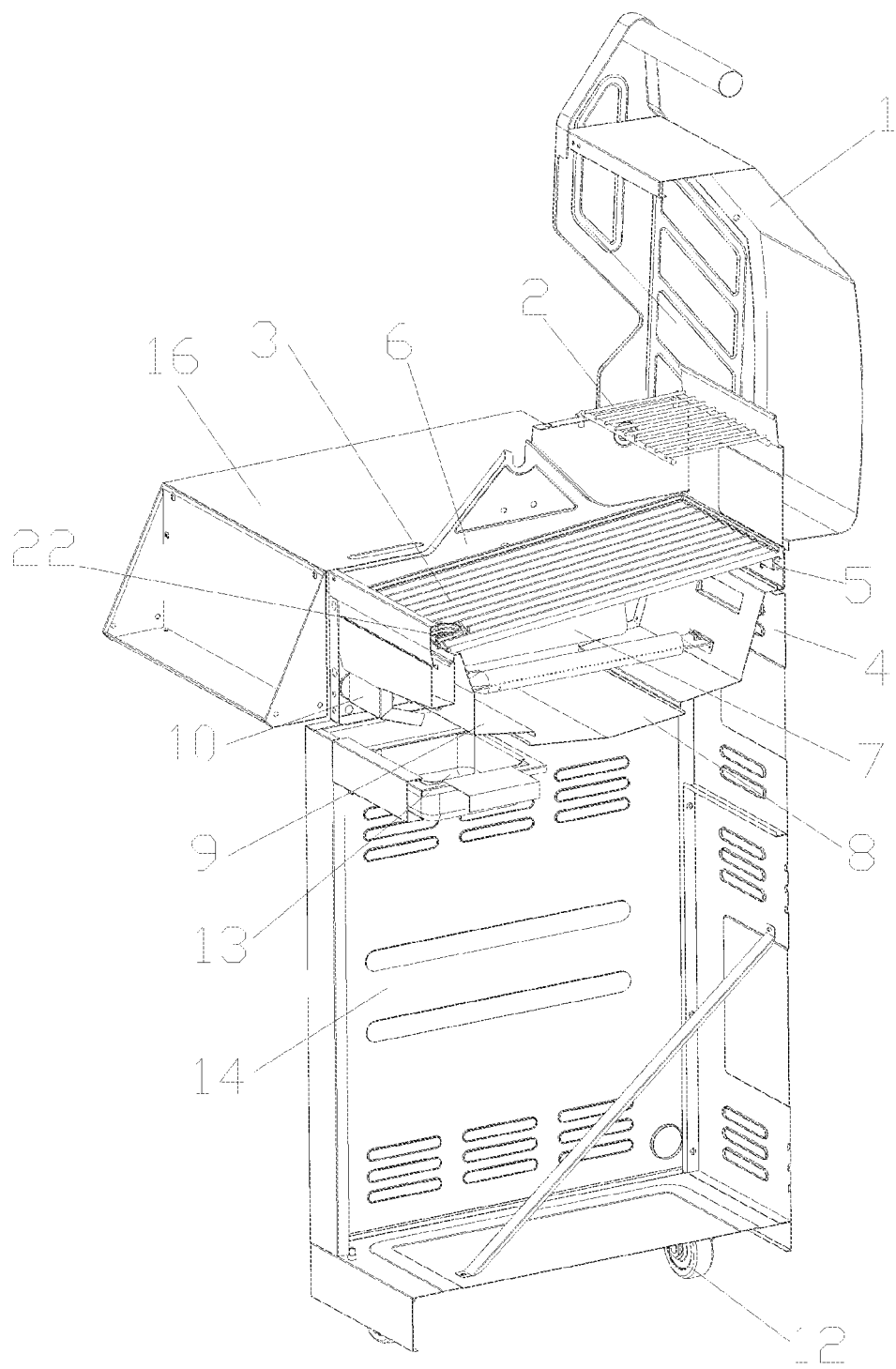
FIG. 4 is a perspective view of a section of A-A of FIG. 2.
Figure 5:
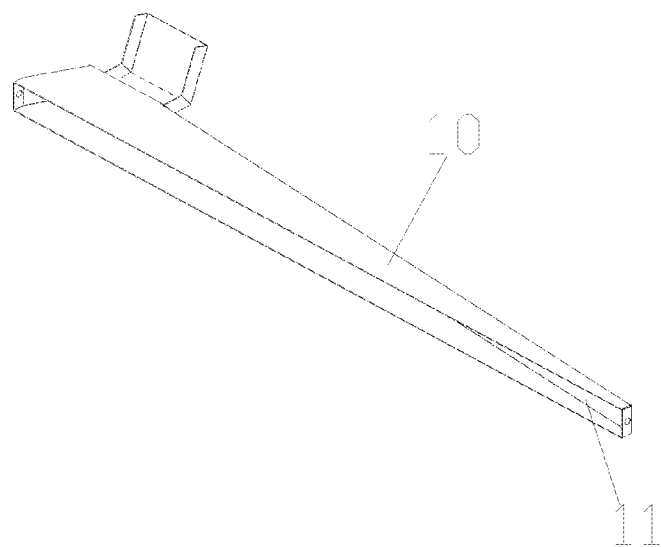
FIG. 5 is a perspective view of an oil guiding slot according to the preferred embodiment of the present invention.
Figure 6:
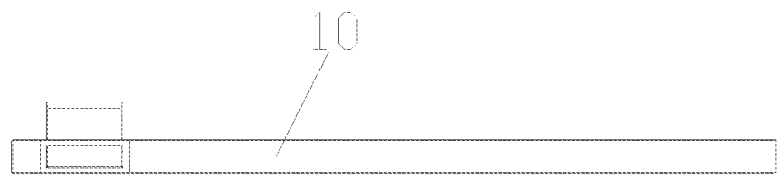
FIG. 6 is a front view of the oil guiding slot according to the preferred embodiment of the present invention.
Figure 7:
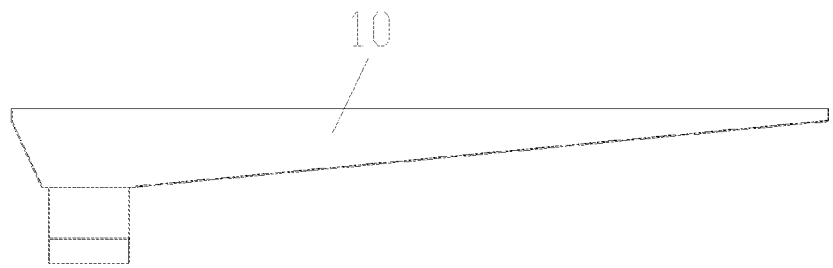
FIG. 7 is a bottom view of the oil guiding slot according to the preferred embodiment of the present invention.
Figure 8:
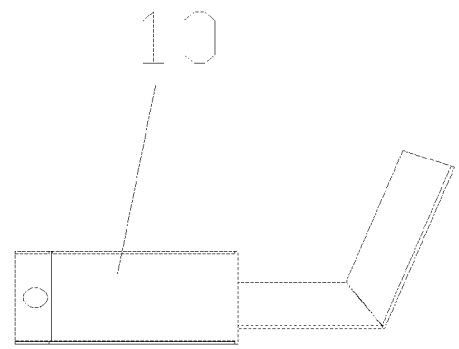
FIG. 8 is a right view of the oil guiding slot according to the preferred embodiment of the present invention.
Figure 9:
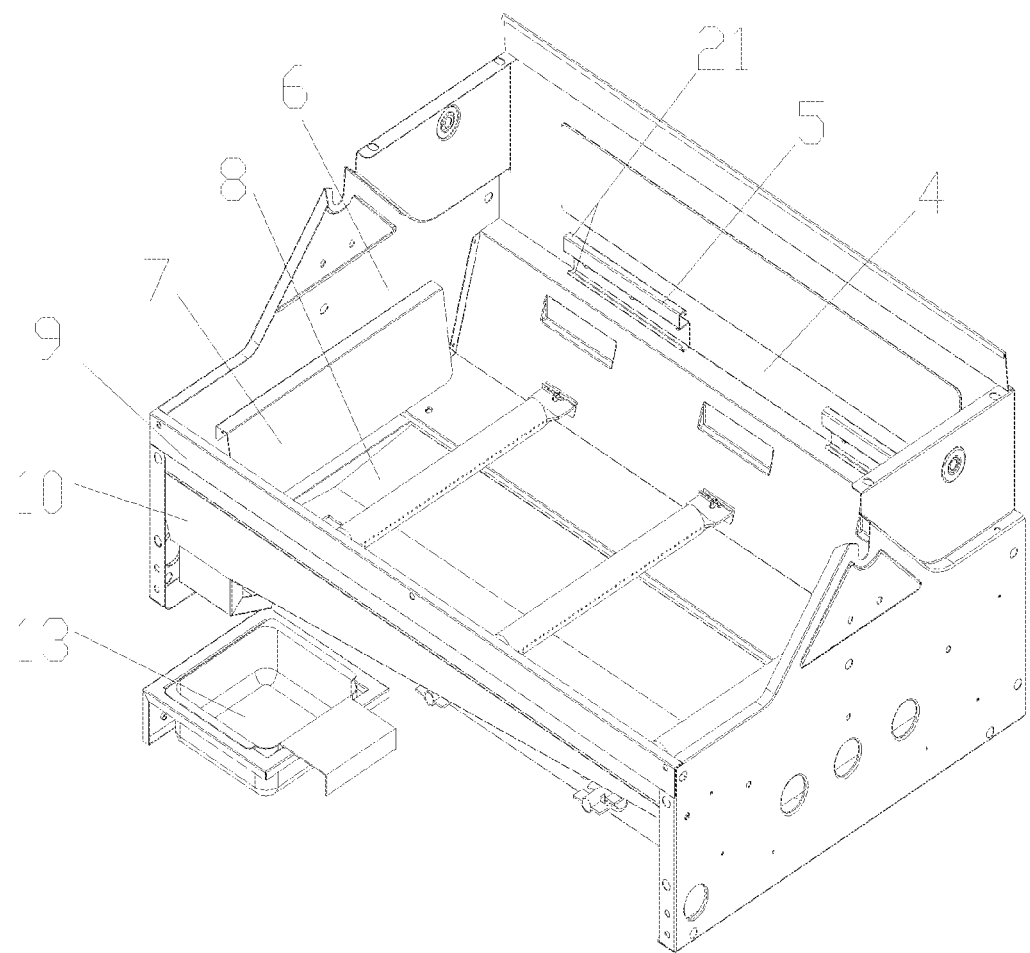
FIG. 9 is a sketch view of a grill frame according to the preferred embodiment of the present invention.
Figure 10:
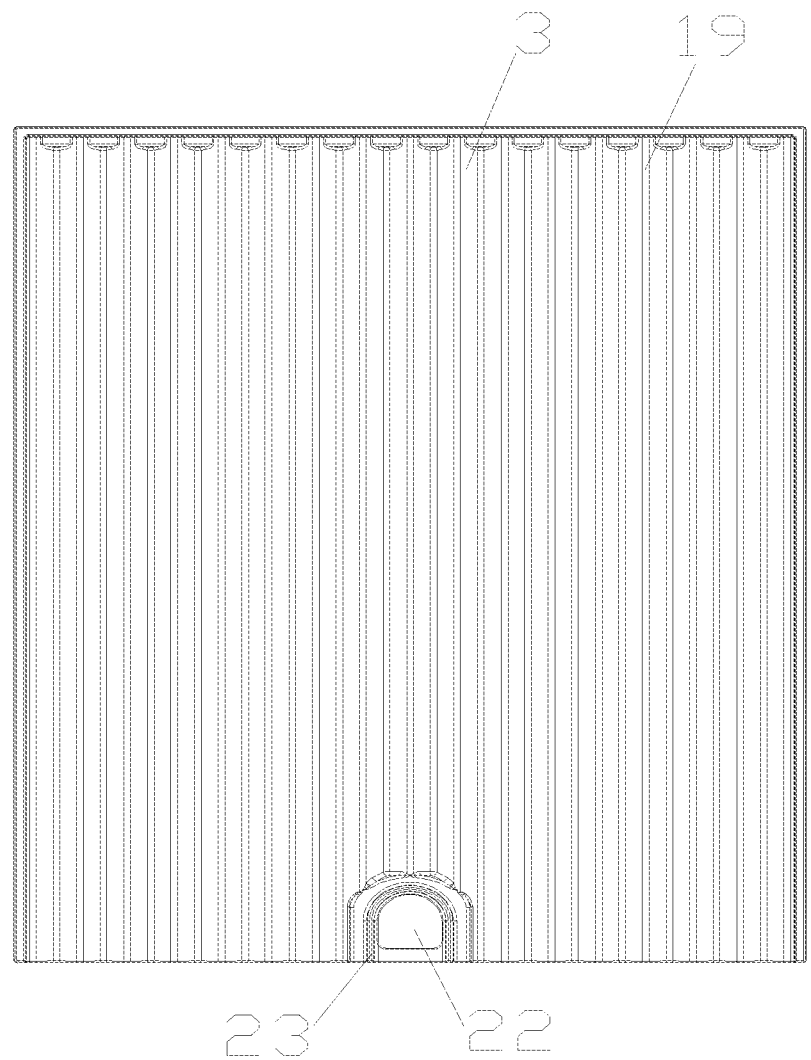
FIG. 10 is a front view of a roasting plate according to the preferred embodiment of the present invention.
Figure 11:
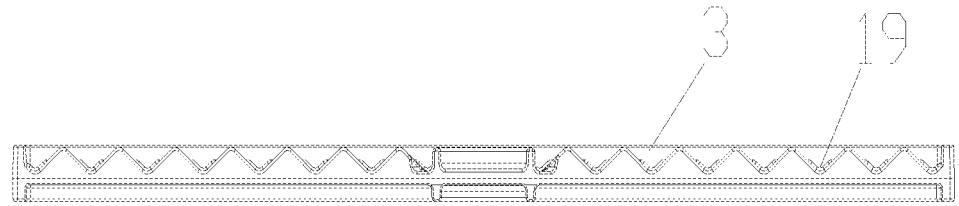
FIG. 11 is a bottom view of the roasting plate according to the preferred embodiment of the present invention.
Figure 12:
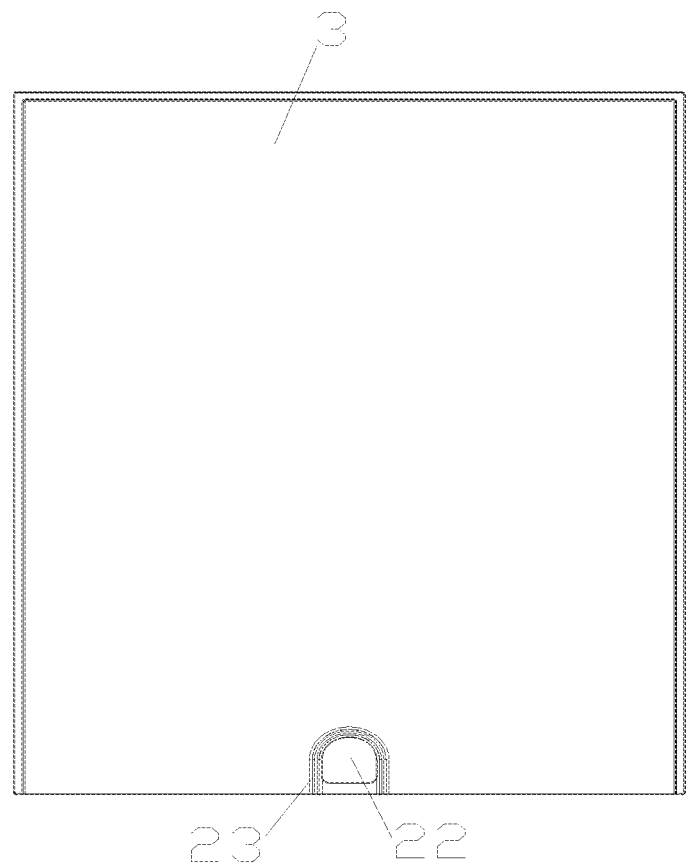
FIG. 12 is a back view of the roasting plate according to the preferred embodiment of the present invention.
Figure 13:
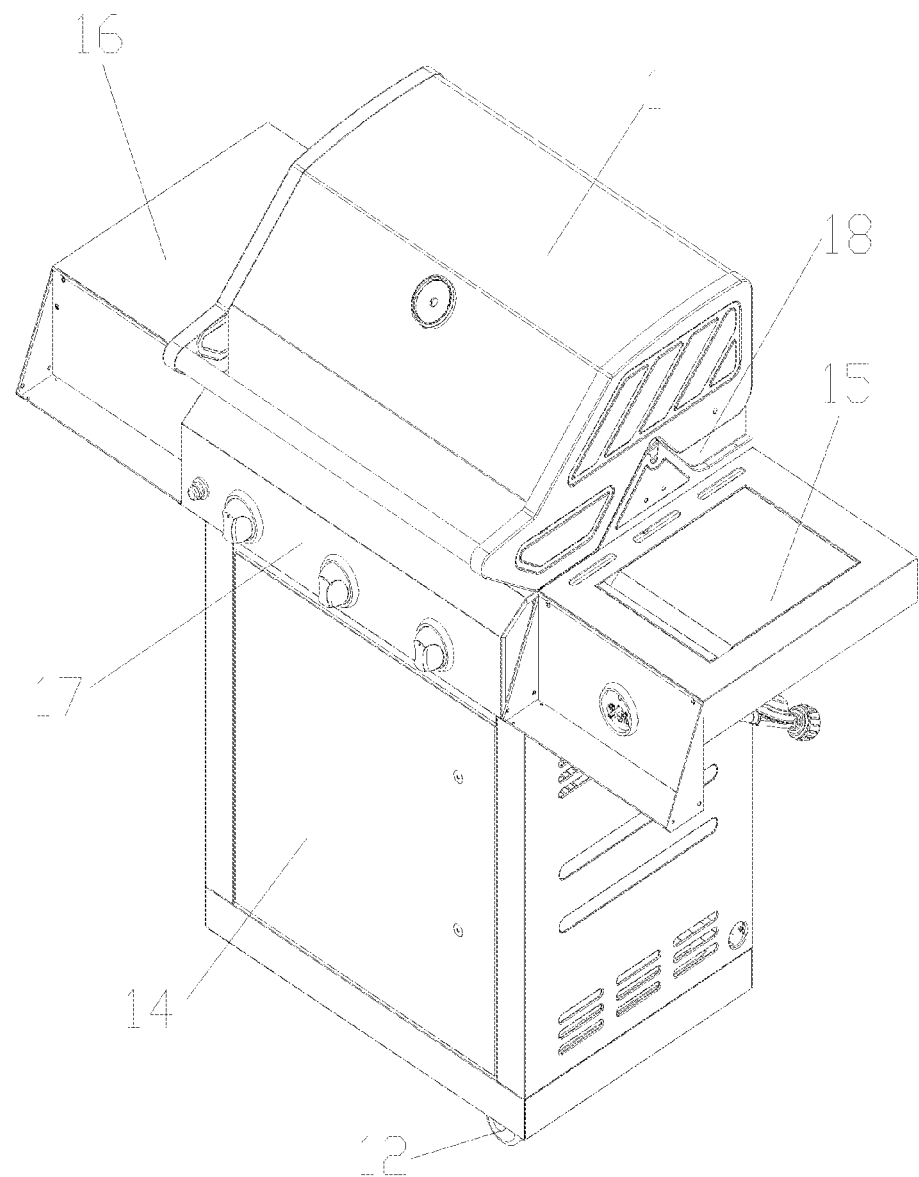
FIG. 13 is a sketch view of the grill at work according to the preferred embodiment of the present invention.

Referring to FIGS. 1-13 of the drawings, according to a preferred embodiment of the present invention, a grill is illustrated.

A grill comprises an upper cover 1, a supporting body 14 and a grill frame 18. The grill frame 18 is provided at an upper end of the supporting body 14. The upper cover 1 is provided at an upper end of the grill frame 18 and is able to open and close. The grill frame 18 comprises left and right boards 6, a back board 4 and a front board 9, which all enclose into the grill frame 18. The left and right boards 6, the back board 4 and the front board 9 are welded into a whole or fixed via fasteners. Specifically, reflecting boards 7 for reflecting downward heat produced in a process of roasting onto food to roast the food are respectively provided at internal sides of the left and right boards 6, so as to avoid wasting the heat and save energy; an insulating board 8 is provided at a bottom of the grill frame 18 to avoid conducting heat into the supporting body 14, so as to accomplish heat insulation effects; and the insulating board 8 also has a function of reflecting heat, wherein the heat is reflected onto food via the insulating board 8 to roast the food, which avoids wasting the heat and avoids conducting the heat into the supporting body 14 to affect a temperature of a steel cylinder. Heaters 24 are provided within the grill frame 18; and a roasting plate 3 tilting towards a front of the grill frame 18 is provided above the heaters 24. The roasting plate 3 has slots 19, through which oil and grease drip down into an oil dripping slot 20 at the front board 9 and then into an oil guiding slot 10 below the front board 9. The oil guiding slot 10 has an oil channel 11 at a certain angle. An oil collecting box 13 is provided below a side of the oil guiding slot 10. A warming net 2 is provided above the roasting plate 3 and mounted on the left and right boards 6. A panel 17 is provided in front of the front board 9. The roasting plate 3 has double surfaces, wherein one surface is a roasting board having the slots 19 for roasting the food and other surface is a flat frying board 25 for frying the food. Two holders 5 for holding the roasting plate 3 are respectively provided at an internal side of the back plate 4 and each holder 5 has two holding positions 21. When an end of the roasting plate 3 is provided at a first holding position 21 at an upper part of the holder 5, the roasting board having the slots 19 of the roasting plate 3 faces up and a back end of the roasting plate 3 is raised to tilt a front thereof, in such a manner that the roasting oil and grease flow through the slots 19 on the roasting plate 3 into the oil guiding slot 10 below the front board 9, so as to be collected. When the end of the roasting plate 3 is provided at a second holding position 21 at a lower part of the holder 5, the flat frying board 25 of the roasting plate 3 faces up, when the roasting plate 3 is provided without obliqueness to fry food on the flat frying board 25 thereof. The roasting plate 3 has a hole 22 for observing fire and a flange 23 is provided around a periphery of the hole 22. When roasting or frying, the flange 23 around the periphery of the hole 22 is able to prevent the oil and grease from flowing out through the hole 22. A lateral frame 16 and a lateral stove 15 are respectively provided at two sides of the supporting body 14 and at two sides of the grill frame 18. Trundles 12 are provided at a bottom of the supporting body 14 to facilitate moving the grill.

The grill of the present invention has following working principles. In order to roast food, one end of the roasting plate 3 is provided at the first holding position 21 at the upper part of the holder 5 and other end of the roasting plate 3 is provided on the front board 9, when the roasting plate having the slots 19 of the roasting plate 3 faces up and the roasting plate 3 has the back end raised to tilt the front. When the food are being roasted, produced oil and grease on the roasting plate 3 flow through the slots 19 to drip into the oil guiding slot 10 below the front board 9; and the oil and grease in the oil guiding slot 10 flow into the oil collecting box 13 below the side of the oil guiding slot 10 through the oil channel 23 at the certain angle, so as to be collected inside the oil collecting box 13, wherein food residues and the oil and grease are prevented from dripping into a firing zone, so as to eliminate potential danger, such as catching on fire. In order to fry food, one end of the roasting plate 3 is provided at the second holding position 21 at the lower part of the holder 5 and other end of the roasting plate 3 is provided on the front board 9, when the flat frying board of the roasting plate 3 faces up and the roasting plate 3 is a flat surface where the food are fried by users. The hole 22 for observing fire of the roasting plate 3 facilitates observing a fire condition below the roasting plate 3 and accordingly adjusting the fire. The flange 23 is provided around the periphery of the hole 22 to prevent the oil and grease produced in the process of roasting and frying from flowing out through the hole 22. Meanwhile, the reflecting boards 7 and the insulating board 8 are able to focus the heat within the grill frame 18 onto the roasting plate 3; and the insulating board 8 also avoids conducting the heat into the supporting body 14 and improves safety within the supporting body 14. Thus, the grill of the present invention has features of safety, reliability, convenience of using, energy-saving and environment-friendliness.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A grill, comprising an upper cover, a supporting body and a grill frame, wherein:

said grill frame is provided at an upper end of said supporting body; said upper cover is provided at an upper end of said grill frame and able to open and close; said grill frame comprises left and right boards, a back board and a front board, which all enclose into said grill frame; heaters are provided within said grill frame; a roasting plate tilting towards a front of said grill frame is provided above said heaters; said roasting plate has slots through which oil and grease drip down into an oil dripping slot on said front board and then into an oil guiding slot below said front board; said oil guiding slot has an oil channel at a certain angle; an oil collecting box is provided below a side of said oil guiding slot; a warming net is provided above said roasting plate and mounted on said left and right boards; and a panel is provided in front of said front board;

a holder for holding said roasting plate is provided an internal side of said back board and said holder has two holding positions;

said roasting plate has two surfaces, comprising a roasting board having said slots and a flat frying board;

said roasting plate has a hole for observing fire and a flange is provided around a periphery of said hole.

2. A grill, comprising an upper cover, a supporting body and a grill frame, wherein:

said grill frame is provided at an upper end of said supporting body; said upper cover is provided at an upper end of said grill frame and able to open and close; said grill frame comprises left and right boards, a back board and a front board, which all enclose into said grill frame; heaters are provided within said grill frame; a roasting plate tilting towards a front of said grill frame is provided above said heaters; said roasting plate has slots through which oil and grease drip down into an oil dripping slot on said front board and then into an oil guiding slot below said front board; said oil guiding slot has an oil channel at a certain angle; an oil collecting box is provided below a side of said oil guiding slot; a warming net is provided above said roasting plate and mounted on said left and right boards;, and a panel is provided in front of said front board;

reflecting boards for reflecting downward heat produced in a process of roasting onto food to roast the food are respectively provided at internal sides of said left and right boards; and an insulating board is provided at a bottom of said grill frame to avoid conducting heat into said supporting body;

a holder for holding said roasting plate is provided an internal side of said back board and said holder has two holding positions;

said roasting plate has two surfaces, comprising a roasting board having said slots and a flat frying board;

said roasting plate has a hole for observing fire and a flange is provided around a periphery of said hole.

3. The grill, as recited in claim 1, wherein a lateral frame and a lateral stove are respectively provided at two sides of said supporting body and at two sides of said grill frame.

4. The grill, as recited in claim 2, wherein a lateral frame and a lateral stove are respectively provided at two sides of said supporting body and at two sides of said grill frame.

5. The grill, as recited in claim 3, wherein trundles are provided at a bottom of said supporting body.

6. The grill, as recited in claim 4, wherein trundles are provided at a bottom of said supporting body.

* * * * *